No. 853,681. PATENTED MAY 14, 1907.
J. COOK & J. F. BRADY.
SHEARS.
APPLICATION FILED FEB. 25, 1907.
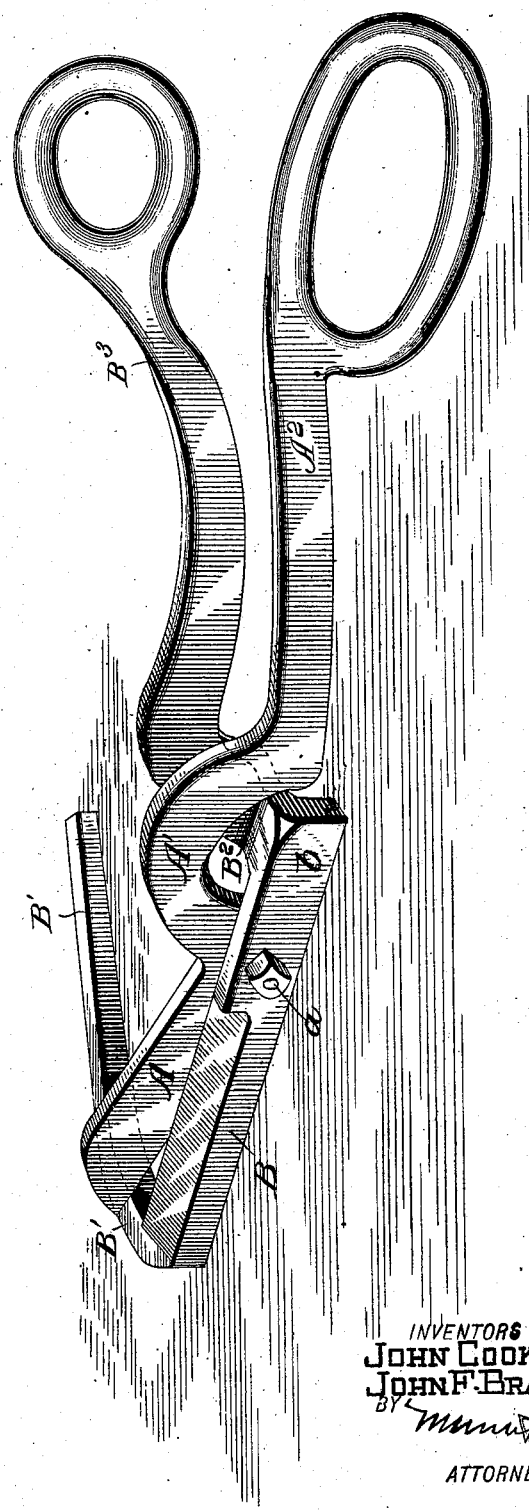
WITNESSES:
INVENTORS
JOHN COOK
JOHN F. BRADY
BY
ATTORNEYS

UNITED STATES PATENT OFFICE.

JOHN COOK AND JOHN F. BRADY, OF NEW PAYNESVILLE, MINNESOTA.

SHEARS.

No. 853,681.  Specification of Letters Patent.  Patented May 14, 1907.

Application filed February 25, 1907. Serial No. 359,317.

*To all whom it may concern:*

Be it known that we, JOHN COOK and JOHN F. BRADY, both citizens of the United States, residing at New Paynesville, in the county of Stearns and State of Minnesota, have invented a new and useful Improvement in Shears, of which the following is a specification.

Our invention is in the nature of an improvement in shears designed more especially for cutting tin and other sheets of metal or tough material.

It relates to that class of shears in which both handles are above the plane occupied by the sheet of material to be cut, so that the sheet of metal does not have to be bent out of the way of the handles in cutting.

Our invention consists in forming the lower blade of the shears with a laterally and rearwardly bent arm which lies in a horizontal plane at right angles to the normal plane of the blades and which serves to balance the shears and support the tin while it is being cut.

It also consists in the special construction and arrangement of the blades of the shears in relation to the handles, whereby the shears are enabled to cut curves with greater facility, as hereafter described with reference to the drawing, in which the figure is a perspective view of the shears in its normal position for use.

A, B, are the two cutting blades of the shears. The upper cutting blade has a shank that is first bent up and then down to form a goose-neck bend A' and is then extended rearwardly to form the handle A² which is provided with a suitable loop or hand-hold at the rear end.

The lower cutting blade B has its front end reduced in cross section and bent laterally to one side and then rearwardly, as seen at B', to form a steadying arm to balance the shears and support the tin which lies on top of the arm. The rear end of the lower blade is off-set laterally at B² to pass behind the goose-neck of the other blade and is then extended rearwardly to form the upper handle B³ which is also formed with a loop or other hand-hold.

The two blades are connected together by a pivot or hinge bolt $a$ in front of the goose-neck and the heel $b$ of the lower blade extends some distance in rear of the pivot bolt, and the off-set and upwardly extending bend of the lower blade is thus made to rise adjacent to and bearing against the goose-neck of the other blade. This braces the blades against any tendency to twist on the pivot bolt when operating on heavy work.

Having thus described our invention, what we claim as new and desire to secure by Letters Patent is:

1. A pair of shears having a lower blade formed with a rigidly attached and laterally projecting supporting arm and a straight upper blade playing inside of said arm.

2. A pair of shears having one of its blades provided at its front end with an integral arm extending laterally and rearwardly.

3. A pair of shears having two pivoted blades and two handles formed integrally with the blades and both handles lying above the plane of the cutting edge of the lower blade, the lower blade also having at its front end a laterally and rearwardly extended arm.

4. A pair of shears, comprising an upper blade having the shank of its handle bent first up and then down to form a goose-neck, and a lower blade pivoted to the upper blade in front of the goose-neck bend and having its heel portion extended rearwardly of the pivot and then off-set and bent up to lie flat against the goose-neck and thence extended to form an upper handle.

JOHN COOK.
JOHN F. BRADY.

Witnesses:
L. K. SEXTON,
T. F. CARLIN.